United States Patent [19]
Culver

[11] 3,754,338
[45] Aug. 28, 1973

[54] SPINAL COLUMN SIMULATOR
[75] Inventor: Clyde C. Culver, Rochester, Mich.
[73] Assignee: General Motors Corporation, Detroit, Mich.
[22] Filed: Mar. 30, 1972
[21] Appl. No.: 239,489

[52] U.S. Cl. .................................................. 35/17
[51] Int. Cl. ........................................... G09b 23/00
[58] Field of Search............................ 35/17; 73/172

[56] References Cited
UNITED STATES PATENTS
979,147   12/1910   Fryette..................................... 35/17
3,557,471   1/1971   Payne ...................................... 35/17

Primary Examiner—Harland S. Skogquist
Attorney—W. E. Finken et al.

[57] ABSTRACT

A spinal column simulator includes a plurality of vertebra simulating members connected by respective split-ball and socket connections. Viscoelastic material extends between the members and normally maintains them against relative angular movement, while viscoelastic material located between the ball portions normally maintains the members against movement toward or away from each other and consequent shortening or lengthening of the simulator. This viscoelastic material may be polyvinyl chloride solid, polyvinyl chloride foam, polyethylene foam, or polyurethane foam. The viscoelastic material absorbs a quantity of energy as the members move angularly or axially of the simulator under impact loading, and this quantity of energy is equal to between 1.25 and 2.75 times the energy expended by the viscoelastic material in returning the members to their original positions such that the members move in a manner simulating the movement of a human spinal column under impact loading. The viscoelastic material extending between the members has a generally annular but slightly eccentric configuration such that the angular movement of the members in opposite directions and the relative absorption and expenditure of energy during this movement varies in a manner simulating forward and rearward movements of the human neck portion of the spinal column under impact loading.

9 Claims, 5 Drawing Figures

Patented Aug. 28, 1973  3,754,338

SPINAL COLUMN SIMULATOR

BACKGROUND OF THE INVENTION

This invention relates generally to a spinal column simulator for indicating human spinal column movement under impact loading conditions.

The human spinal column includes a number of vertebrae arranged in a generally vertically extending relationship and providing the main structural support for the human torso, while also providing a spinal cavity for carrying the spinal cord which extends between the head and lower portions of the body to carry nerve impulses controlling body functions. The upper or neck portion of the spinal column also supports the head on the torso. The adjacent vertebrae of the spinal column are connected by joints which function generally like ball and socket type joints to allow multi-directional angular movement of the vertebrae relative to each other and provide the generally versatile movement of the human torso. Since the spinal column plays such an important role in the human anatomy, devices have been constructed in the past to simulate the spinal column on dummies used in impact testing. This impact testing may be performed to study response of the human body under any of numerous impact situations; however, one area of present concern is response of the human body when riding in a vehicle subjected to impact conditions. The spinal column simulators of the past have utilized material of elastomeric polymers, such as rubber, to maintain vertebra simulating members in their relative positions providing the upstanding or vertically extending configuration of the spinal column prior to impact. The members are connected by suitable joints which allow angular movement upon impact such that the elastomeric material absorbs energy and subsequently expends substantially all of this energy to return the members to their original positions relative to each other. However, when the human spinal column is subjected to impact, it has been found that the energy expended by muscles and ligaments returning the vertebrae to their original relative positions is only a portion of that absorbed while resisting the relative movement of the vertebrae under the impact forces. This decreased return energy prevents an overshoot condition in moving the spinal column back to its original position. Spurious movement thus results when a spinal column simulator utilizes elastomeric polymers to return the vertebra simulating members to their original positions since the expended energy is the same as the energy with which movement is resisted.

SUMMARY OF THE INVENTION

One feature of this invention is that it provides an improved spinal column simulator utilizing viscoelastic material for absorbing energy as vertebra simulating members move angularly relative to each other under impact loading and for expending only a portion of this energy to return the vertebra simulating members to their original positions such that the simulator moves in the manner of a human spinal column subjected to impact loading. Another feature of the invention is that the viscoelastic material may be utilized to absorb energy as the vertebra simulating members move angularly relative to each other and axially of the elongated axis of the simulator toward or away from each other under impact loading and to expend only a portion of this energy in returning the members to their original angular and axial positions. Another feature of the invention is that the vertebra simulating members have generally annular configurations and have split-ball and socket connections connecting their central portions, with viscoelastic material located between the ball portions providing axial positioning of the members, and with viscoelastic material between the outer portions of the members providing the angular positioning. Another feature of the invention is that the viscoelastic material may be polyvinyl chloride solid, polyvinyl chloride foam, polyethylene foam, or polyurethane foam. Another feature of the invention is that the viscoelastic material between the outer portions of the vertebra simulating members may have a generally annular but slightly eccentric configuration such that the absorption and expenditure of energy as these members move angularly in opposite directions is in a manner simulating forward and rearward movement of the neck portion of the spinal column when subjected to impact loading.

BRIEF DESCRIPTION OF THE DRAWINGS

An understanding of the present invention will be readily apparent from the following description of the preferred embodiment and the drawings in which.

DESCRIPTION OF THE PREFERRED EMBODIMENT

Figure 1:
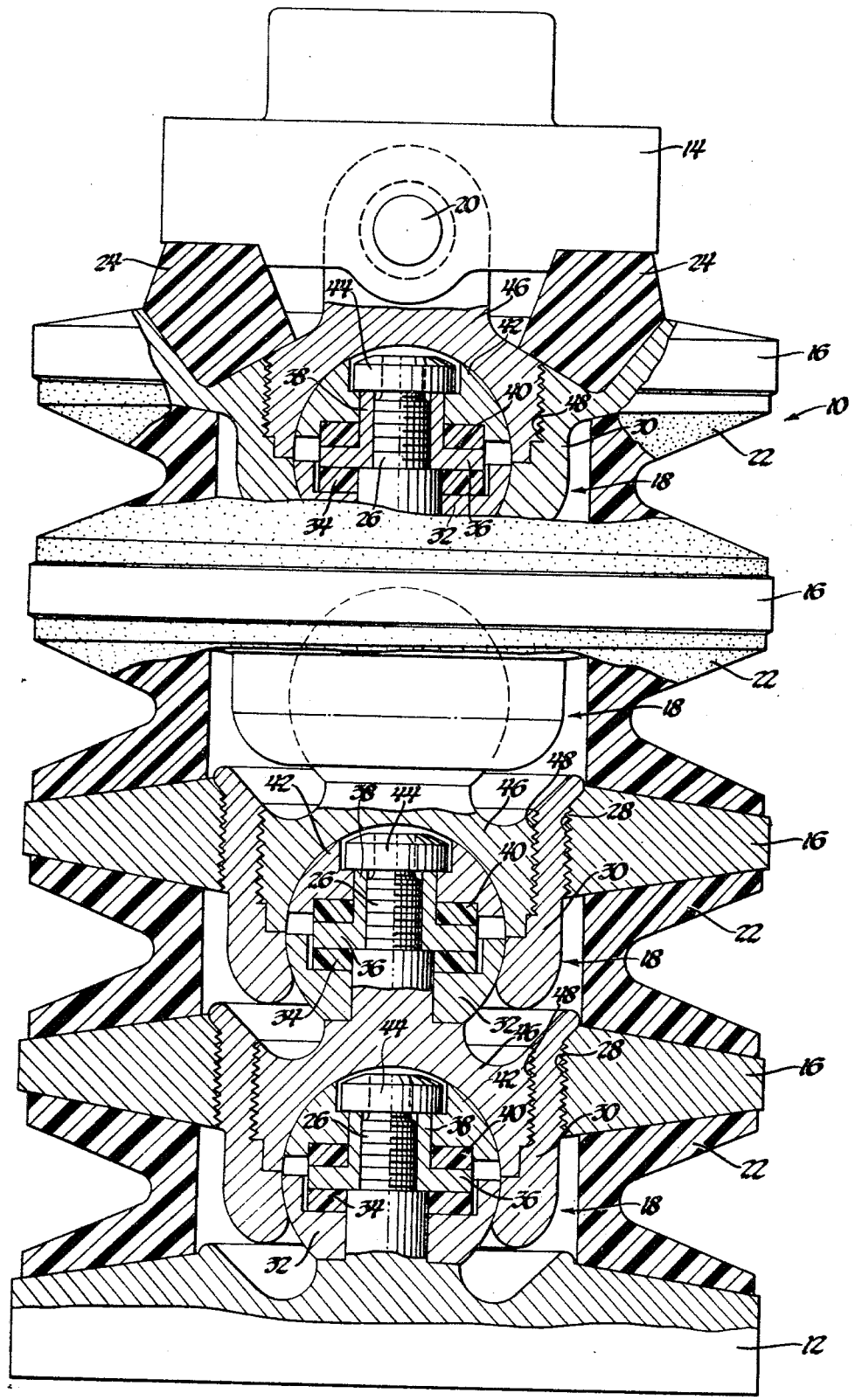
FIG. 1 is a partially broken away sectional view of a spinal column simulator whose vertebra simulating members are positioned relative to each other by viscoelastic material in a manner according to this invention.
Figure 2:
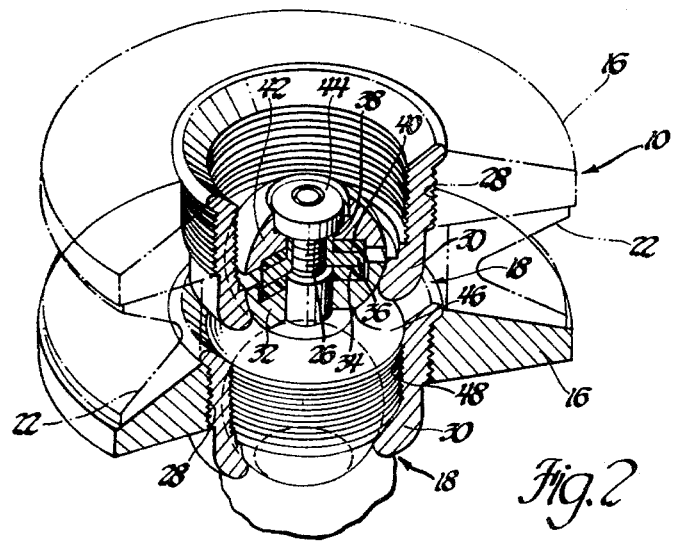
FIG. 2 is a perspective view shown partially in section and illustrating the manner in which the vertebra simulating members of the simulator are connected by split-ball and socket connections.

Referring to FIG. 1 of the drawings, a spinal column simulator for indicating human spinal column movement under impact loading is generally indicated by 10. The simulator has a generally elongated upstanding configuration and is generally circular at its latter outer extremes, see also FIG. 2. As herein disclosed the simulator includes a lower base 12 for attachment on a dummy simulator of a human torso, while the upper end includes an attachment 14 for supporting a head simulator. The disclosed embodiment of the simulator thus functions in a manner simulating the neck portion of the spinal column. It should be pointed out, however, that the simulator is readily adaptable to simulate the back portion or total length of the spinal column. Between the base 12 and attachment 14, the simulator includes a plurality of vertebra simulating members indicated at 16. These members have generally circular outer configurations and are arranged generally parallel to each other in a spaced relationship to provide the simulator with its generally elongated upstanding configuration. The base 12 and lowermost member 16 and the adjacent members 16 are respectively connected for multi-directional angular movement by a plurality of split-ball and socket connections indicated generally at 18. The attachment 14 and the uppermost member 16 are pivotally connected by a pin 20 to simulate the manner in which the occipital bone of the head is pivotally supported by the uppermost vertebra or atlas. Viscoelastic rings 22 formed slightly eccentrically are located between the outer portions of the adjacent members 16 and between the base 12 and lowermost member 16 such that these members normally assume the relative angular positions about connections 18 as shown by FIG. 1. A pair of viscoelastic pads 24 on the uppermost member 16 likewise position the attachment 14 about its pivotal support at pin 20.

The simulator 10 is assembled by first placing the lowermost viscoelastic ring 22 on the base 12 with its downwardly facing frustoconical lower side seating against the upwardly facing frustoconical surface on the base. The base includes a central projection or pin 26 extending upwardly through the central aperture in this seated viscoelastic ring 22. The lowermost vertebra simulating member 16 is placed on this viscoelastic ring and includes a centrally threaded aperture 28 for receiving and positioning a lower socket portion 30. As the lower socket portion 30 is threaded downwardly into aperture 28, it carries a lower ball portion 32 which is apertured to be received by the lower unthreaded portion of pin 26. A viscoelastic washer 34 likewise is received by the unthreaded portion of pin 26 and is captured at its upper side by the lower flange portion 36 of a bushing 38. A suitable tool is utilized to thread bushing 38 onto the upper threaded portion of pin 26 such that its lower end engages both the washer 34 and the upwardly facing ledge on pin 26 between its threaded and unthreaded portions. A viscoelastic washer 40 includes a central aperture which receives the vertically extending portion of bushing 38. The washer 40 is seated against the upper side of flange portion 36 of the bushing and supports an upper ball portion 42 which also includes a central aperture receiving the vertically extending bushing portion. A nut 44 is threaded onto the upper end portion of pin 26 by a suitable tool and engages both the bushing and this ball portion to maintain the ball portions 32 and 42 generally in the spaced complementary relationship shown. An upper socket portion 46 is threaded into a central aperture 48 in the lower socket portion 30 to complete the assembly of the lowermost split-ball and socket connection 18. Upper socket portion 46 of this connection also includes a pin 26 and the next viscoelastic ring 22 is positioned on the top side of the lowermost member 16 such that the assembly of the second, and in a like manner the proceeding connections 18, may proceed in a similar manner. It should be noted, however, that the uppermost member 16 includes an integral portion providing the lower socket portion of the uppermost connection 18.

The viscoelastic rings 22, pads 24, and washers 34 and 40 normally maintain the vertebra simulating members in their relative positions of FIG. 1. Impact loadings tending to cause angular movement of vertebra simulating members 16 about connections 18 are resisted by viscoelastic rings 22 which resist deformation and apply a torque to the outer portions of members 16. After impact forces have subsided, the viscoelastic rings will return to their original positions and move the members 16 likewise to their original positions relative to each other. Likewise, tension impact forces tending to move members 16 away from each other and elongate simulator 10 will cause the lower socket portions 30 to pull upwardly on lower ball portions 32, while the pins 26 and nuts 44 prevent relative movement of bushings 38, and the net effect is that lower ball portions 32 slide upwardly on the lower unthreaded portions of pins 26 such that bushing flange portions 36 and lower ball portions 32 deform the viscoelastic lower washers 34. The washers 34 also return to their original undeformed state after impact forces have subsided to move the members 16 back toward each other to their original positions. Compressive impact forces tending to move members 16 toward each other and shorten simulator 10 will cause the upper socket portions 46 to exert downward forces on upper ball portions 42. These forces will cause the upper ball portions 42 to slide downwardly on bushings 38 and deform the viscoelastic upper washers 40 while the members 16 compress and deform viscoelastic rings 22. If the simulator 10 is in an angularly displaced position when the compressive impact forces are applied, the members 16 may be disengaged with rings 22 over circumferentially aligned portions of their normal engagement. The washers 40 will thus play a larger role in resisting compressive impact forces on simulator 10 when they are not aided by these portions of rings 22. The rings 22 and washers 40 will also return members 16 to their original positions when compressive impact forces subside.

Figure 3:
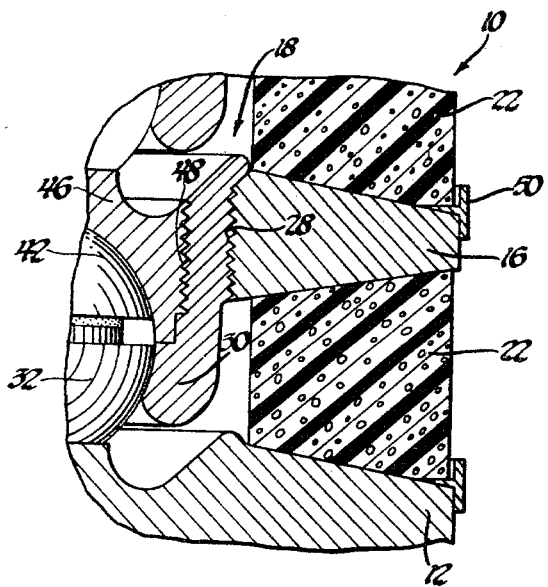
FIG. 3 is a sectional view showing the outer portions of the vertebra simulating members in an embodiment which uses polyurethane foam as the viscoelastic material.

Different viscoelastic materials may be used to manufacture the viscoelastic components described. Polyvinyl chloride solid is one type of such a viscoelastic material which readily lends itself to use with this simulator. One advantage of this material is that it is capable of being machined to provide the required deformation characteristics as will be later described. It should be pointed out that a cutting depth of at least four or five thousandths of an inch is required to provide good machining characteristics. It is likewise possible to use polyvinyl chloride foam or polyethylene foam to manufacture these viscoelastic components of the simulator. Polyurethane foam may also be used; however, when this type of material is used it is desirable to utilize a positioning ring such as shown by 50 in FIG. 3 to prevent permanent deformation of the ring 22 upon impact loading. This ring 50 provides a support for the polyurethane foam and has been found to prevent viscous flow of the polyurethane foam causing this deformation.

Figure 4:
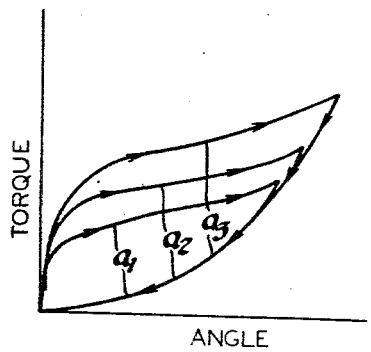
FIG. 4 is a graph showing the manner in which vertebrae of the spinal column are loaded and unloaded under impact conditions and the resulting angular movement of the spinal column.

FIG. 4 is a generally schematic graph showing the torque human spinal column muscles exert as they resist angular movement of the spinal column during impact loadings $a_1$, $a_2$, and $a_3$ of respectively increasing severity. What this graph indicates generally is that the spinal column will move to increased angles of displacement as the severity of the impact loading is increased. However, it should also be mentioned that this increase in angular displacement does have a certain limit beyond which no spinal column movement will take place without permanent damage to ligaments and muscles associated with the vertebrae of the spinal column. As muscles and ligaments move the spinal column from the angularly displaced position back to their original upstanding positions, it can be seen from FIG. 4 that they exert a torque substantially below that which they exert during the loading. This decreased return torque enables the spinal column to return to its original generally linear configuration without causing an overshoot condition and pendulum-like movement to rest.

It is thus apparent that certain problems would exist were one to use an elastomeric polymer, such as rubber, for the rings 22, the pads 24, and the washers 34 and 40. For instance, an elastomeric material would not be rate sensitive in the manner shown in FIG. 4 by the upper loading curves $a_1$, $a_2$, and $a_3$ and absorb more energy within the same relative ranges of angular movement as the impact severity is increased. Also, upon reaching the maximum angle of spinal column angular movement, the return torque would be the same as the loading torque since elastomeric polymers expend substantially all of the energy they absorb upon returning to their original position.

Figure 5:
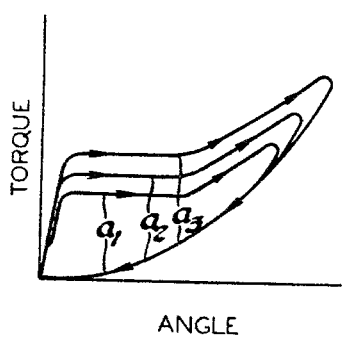
FIG. 5 is a graph similar to FIG. 4 showing the type of results which are obtainable when a spinal column simulator according to this invention is subjected to impact conditions.

Utilizing a viscoelastic material for the components as has been described enables the movement of the spinal column simulator to closely approach that of the human spinal column. FIG. 5 is generally illustrative of the type of movement which is obtainable using this type of material with progressively severe impacts $a_1$, $a_2$, and $a_3$. The viscoelastic material is rate sensitive in that it resists deformation with increased forces as the severity of the impact loading is increased. Also, the force with which the viscoelastic material tends to return to its original position after deformation is at a lower level than that with which it resists deformation due to internal losses. When impact loading is applied to the simulator to cause maximum deformation in time periods less than 300 milliseconds, which is generally similar to the type of movement obtained when a person is involved in a vehicle collision, the movement of the simulator is very similar to the movement of a human spinal column if the quantity of energy the viscoelastic material absorbs during deformation is between 1.25 and 2.75 times the quantity of energy its expends while returning to its orginal position. The most desirable results are obtainable if this energy of absorption is between 1.43 and 2.50 times the expended energy. When the simulator is used as a neck simulator, as in the particular embodiment disclosed, the best results will be obtained when the energy of absorption is between 1.43 and 2.0 times the expended energy for forward neck movement, and when the energy of absorption is between 1.67 and 2.5 times the expended energy for rearward neck movement. Lower values for the ratio of the absorbed energy to the expended energy are necessary when forward neck movement is simulated due to the elastic reaction produced as the human chin contacts the chest and allows additional energy storing capacity. The eccentric configuration of the viscoelastic rings 22 is to compensate for this consideration. As is obvious from the previous statement, the ratio of the absorbed energy to the expended energy is dependent not only on the viscoelastic characteristics of an amorphous mass of the material utilized but also on the particular configuration of the viscoelastic component. The machinability of the polyvinyl chloride solid material thus enables one to readily change the configuration of the viscoelastic components and to thus vary this energy ratio.

The invention thus provides an improved spinal column simulator.

What is claimed is:

1. A spinal column simulator for indicating human spinal column movement under impact loading, the simulator comprising:
    a plurality of vertebra simulating members arranged in a predetermined linear relationship;
    ball and socket means connecting the adjacent members to allow angular movement thereof relative to each other away from and back to the predetermined linear relationship; and
    synthetic viscoelastic material extending between the members to resist angular movement thereof from the predetermined linear relationship and to urge the members back to this relationship upon movement therefrom, the viscoelastic material absorbing a quantity of energy while resisting angular movement of the members under impact loading and this quantity of energy being equal to between 1.25 and 2.75 times the quantity of energy the viscoelastic material expends while urging the members back to the predetermined linear relationship to thereby allow movement of the members in a manner simulating the movement of a human spinal column under impact loading.

2. A spinal column simulator for indicating human spinal column movement under impact loading, the simulator comprising:
    a plurality of generally circular vertebra simulating members arranged in a linear relationship generally parallel with each other to provide the simulator with a predetermined elongated configuration of a predetermined length;
    a plurality of ball and socket connections respectively connecting the central portions of the adjacent members to allow angular movement of the members relative to each other away from and back to the predetermined linear relationship;
    a plurality of linear connections respective the ball and socket connections for allowing opposite rectilinear movement of the members relative to each other generally along the elongated axis of the simulator to increase or decrease the predetermined length thereof; and
    synthetic viscoelastic material received between the outer portions of the members and by the linear connections to resist angular and rectilinear movement of the members away from their relative positions providing the predetermined elongated configuration and length of the simulator and to urge the members back to these relative positions upon movement therefrom, the viscoelastic material absorbing a quantity of energy while resisting angular and rectilinear movement of the members under impact loading and this quantity of energy being equal to between 1.43 and 2.5 times the quantity of energy the viscoelastic material expends while urging the members back to the relative positions providing the predetermined elongated configuration and length of the simulator to thereby allow movement of the simulator in a manner simulating the movement of a human spinal column under impact loading.

3. A spinal column simulator for indicating human spinal column movement under impact loading, the simulator comprising:

a plurality of generally circular vertebra simulating members arranged in a spaced linear relationship generally parallel with each other to provide the simulator with a predetermined elongated configuration of a predetermined length;

a plurality of ball and socket connections including a plurality of receptacle portions respectively mounted on the members and defining respective open ended spherical sockets, a plurality of pairs of spaced generally complementary ball portions respectively received by the sockets with the ball portions adjacent the socket openings connected to the central portions of the adjacent members to thereby allow connected angular movement of the members relative to each other away from and back to their relative positions providing the predetermined elongated configuration of the simulator, and slidable means connecting the ball portions of each pair to allow movement of the member toward and away from each other to decrease and increase the predetermined length of the simulator; and synthetic viscoelastic material received between the outer portions of the members and between the ball portions of each pair to resist angular and rectilinear movement of the members toward and away from their relative positions providing the predetermined elongated configuration and length of the simulator and to urge the members back to these relative positions upon movement therefrom, the viscoelastic material absorbing a quantity of energy while resisting angular and rectilinear movement of the members under impact loading and this quantity of energy being equal to between 1.43 and 2.5 times the quantity of energy the viscoelastic material expends while urging the members back to the relative positions providing the predetermined elongated configuration and length of the simulator to thereby allow movement of the simulator in a manner simulating movement of a human spinal column under impact loading.

4. The spinal column simulator of claim 3 wherein the viscoelastic material is a polyvinyl chloride solid.

5. The spinal column simulator of claim 3 wherein the viscoelastic material is a polyvinyl chloride foam.

6. The spinal column simulator of claim 3 wherein the viscoelastic material is a polyethylene foam.

7 The spinal column simulator of claim 3 wherein the viscoelastic material is a polyurethane foam.

8. The spinal column simulator of claim 3 wherein the viscoelastic material between the outer portions of the members has a generally annular but slightly eccentric configuration such that angular movement of the members under impact loading in one direction causes energy absorption by the viscoelastic material equal to a quantity of energy between 1.43 and 2.00 times the energy expended thereby while angular movement of the members under impact loading in the opposite direction causes energy absorption by the viscoelastic material equal to between 1.67 and 2.50 times the energy expended thereby to thus allow movement of the members in a manner simulating forward and rearward movement of the neck portion of a human spinal column under impact loading.

9. The spinal column simulator of claim 8 in which the uppermost member is pivotally connected to an attachment for attaching a head simulator and the pivotal movement is controlled by viscoelastic material to simulate pivotal movement of the occipital bone about the atlas.

* * * * *